Oct. 29, 1935.  H. A. BEEKHUIS  2,019,112
PROCESS FOR FUSING MATERIALS
Filed May 2, 1931  2 Sheets-Sheet 2
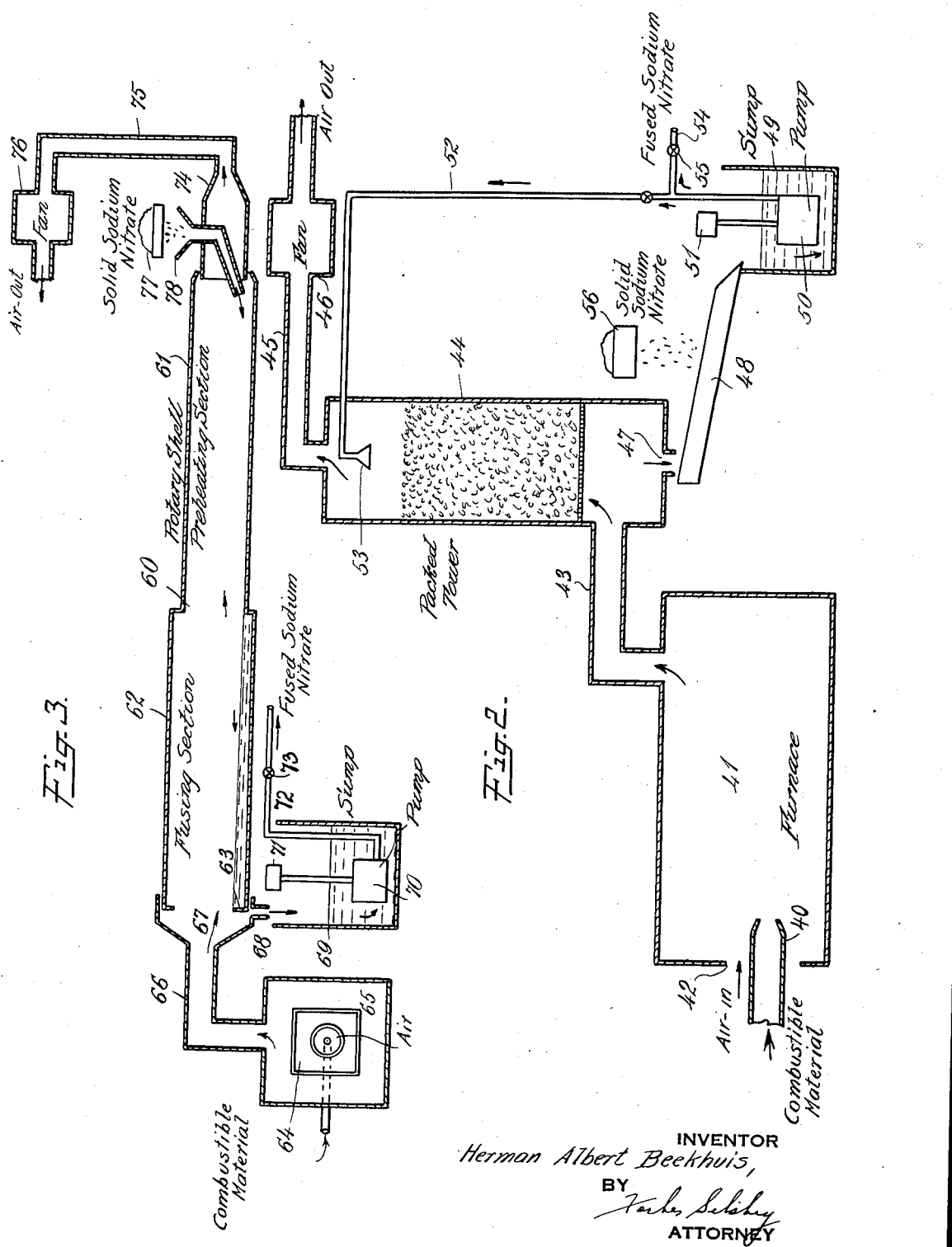
INVENTOR
Herman Albert Beekhuis,
BY
ATTORNEY Patented Oct. 29, 1935

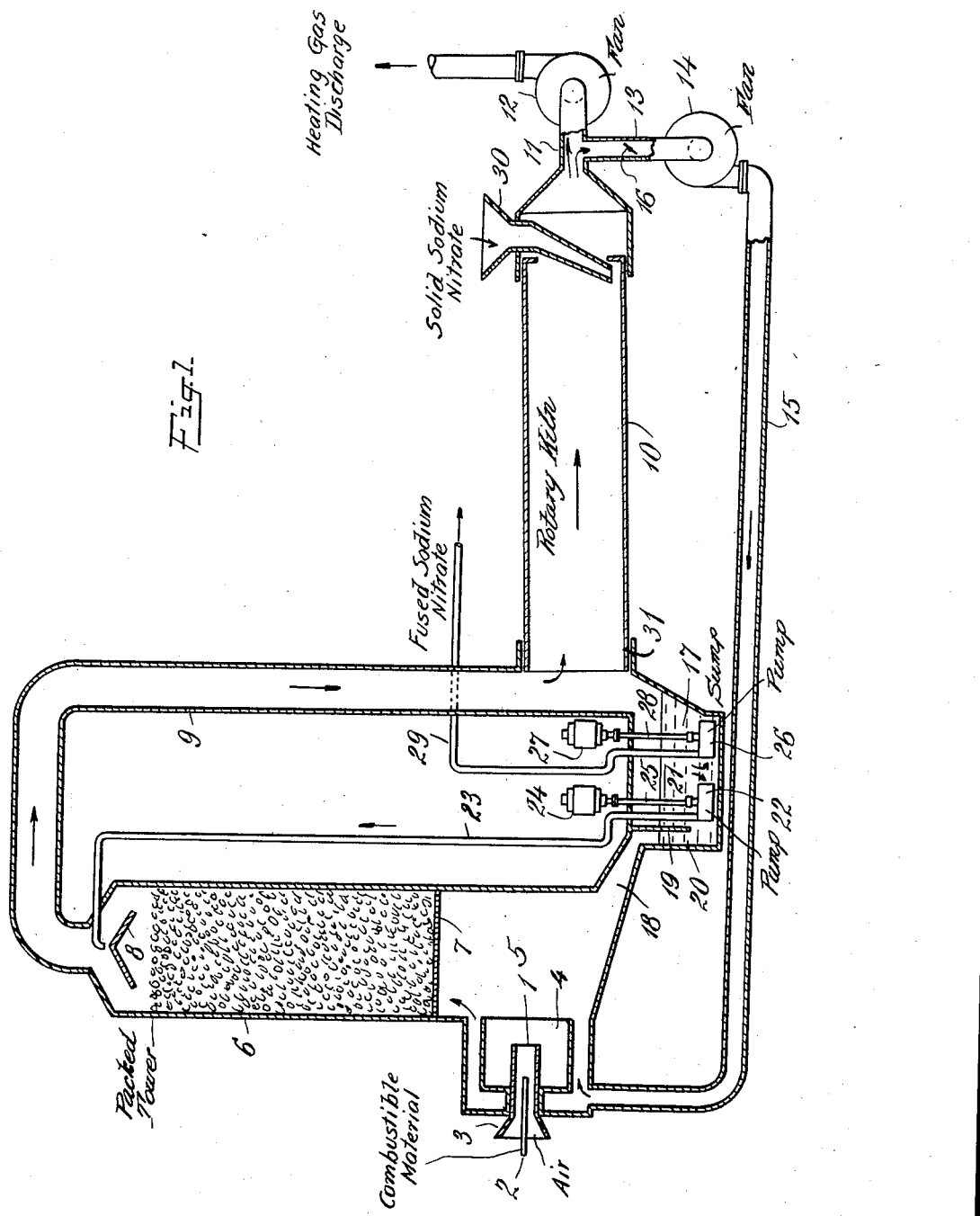

2,019,112

UNITED STATES PATENT OFFICE 2,019,112

PROCESS FOR FUSING MATERIALS

Herman Albert Beekhuis, Syracuse, N. Y., assignor to Atmospheric Nitrogen Corporation, New York, N. Y., a corporation of New York Application May 2, 1931, Serial No. 534,633

27 Claims. (Cl. 23—102)

This invention relates to a process of fusing solid materials. More particularly, this invention relates to a process for fusing a solid fusible inorganic salt, for example, sodium nitrate.

It is desirable for many purposes to fuse a solid inorganic salt such as sodium nitrate and to employ the fused material in various manners. The fused material may be cooled to form a solid having properties peculiar to the material thus treated. Thus United States Patent No. 260,786 of July 11, 1882 describes the granulation of sodium nitrate by fusing it and running it through a sieve or other means. Again, United States Patent No. 249,275 of November 8, 1881 describes a process for drying sodium nitrate by melting sodium nitrate and mixing the molten nitrate with moist crystalline sodium nitrate to expel the water. As heretofore carried out, the process of melting sodium nitrate has consisted in putting the solid material into a kettle or other container and applying sufficient heat to the vessel to fuse the solid material. If desired, a portion of the solid nitrate may be first melted in the kettle and then more of the solid material added as the melting takes place until the kettle is full.

These methods of fusing solid materials, and particularly sodium nitrate, such as are disclosed in the prior art, are uneconomical and are not adaptable to large scale operations when large quantities of the salt are to be fused. The heat transfer through the walls of the vessel to solid material being melted therein is slow. When large quantities of material are to be fused, such processes required the use either of large kettles or of a number of smaller containers. In using large kettles it becomes extremely difficult to rapidly melt large quantities of the solid without strongly heating portions of the melt which causes decomposition of a nitrate or nitrite. The disadvantages in installing and maintaining in operation, with the constant supervision which is necessary, of a large number of smaller melting devices are obvious.

It is an object of this invention to provide a continuously operable process for the fusion of solid materials and in particular for the fusion of alkali metal nitrates which may be employed in a continuous manner to efficiently and economically fuse large quantities of the material. Other objects of the invention will in part be obvious and will in part appear hereinafter.

I have discovered that solid alkali metal nitrates may be fused by directly contacting the salt with a heating gas. I have further discovered that solid alkali metal nitrates may be fused by heating a melt of the nitrate by direct contact with a heating gas and that by adding the solid salt to the thus heated melt the solid material may be fused by means of the heat absorbed in the melt. It has long been known that alkali nitrates decompose when heated to temperatures but little above their fusion temperatures. Sodium nitrate, for example, decomposes at a temperature in the neighborhood of 380° C. which is but little above its fusion point of about 308° C. Contrary to expectation, however, I have discovered that a melt of sodium nitrate, for example, may be heated by passing a heating gas at a temperature considerably above 380° C. which is given by the literature as the temperature of decomposition of sodium nitrate, in direct contact with the melt without causing an undue decomposition of the sodium nitrate. This discovery makes it possible to employ a relatively highly heated gas for melting of large quantities of sodium nitrate by directly contacting the gas with the solid salt, whereby rapid transfer of large quantities of heat results from the use of relatively highly heated gas without excessive decomposition of the salt ensuing.

My invention, accordingly, comprises fusing a solid alkali metal salt of an oxyacid of nitrogen by directly contacting the salt with a heating gas. The invention further comprises a process for fusing the solid salt by heating a melt of the same by direct contact with a heating gas and then introducing into the thus heated melt solid material. The invention likewise comprises circulating a melt of a fused solid, particularly of a fused inorganic salt, in direct contact with a heating gas and subsequently introducing solid material into the thus heated melt to fuse the solid by means of the heat absorbed in the melt from the heating gas. In its preferred embodiment for the fusing of sodium nitrate, the invention comprises heating a melt of sodium nitrate by direct contact with an oxidizing heating gas, such as for example hot gaseous products of combustion containing free oxygen, having a temperature below about 750° C., maintaining the temperature of the heated material below about 400° C. and introducing into the thus heated melt solid sodium nitrate to fuse it by means of the heat absorbed from the gases.

The invention accordingly comprises the several steps and the relation of one or more of such steps with respect to each of the others thereof, which will be exemplified in the process hereinafter disclosed, and the scope of the invention will be indicated in the claims.

For a fuller understanding of the nature and objects of the invention reference should be had to the following detailed description taken in connection with the accompanying drawings, in which:

Figs. 1, 2 and 3 are views partly in cross section and partly in plane of three forms of apparatus suitable for carrying out the process of this invention.

Referring to Fig. 1, the numeral 1 indicates an oil burner having an oil supply pipe 2 leading into an air intake jacket 3. The hot products of combustion from oil burner 1 pass through a furnace 4 to a space 5 below a tower 6. Tower 6 contains a foraminous plate 7 which serves to support a packing material contained in tower 6. This packing may be, for example, ceramic rings and serves to promote intimate contact of a liquid with a gas passing in countercurrent flow through the tower. Tower 6 likewise contains in its top portion a distributing device 8 for distributing material to the packing in the tower. A gas exhaust pipe 9 leads from the top of tower 6 to a rotary kiln 10. A conduit 11 leads from kiln 10 to a fan 12 which serves to draw air through intake jacket 3 of burner 1, and the gaseous combustion products through tower 6, pipe 9 and kiln 10. An offtake pipe 13 leads from conduit 11 to a second fan 14 which serves to recirculate a part of the gases leaving kiln 10 back through a conduit 15 to space 5 below tower 6. A valve 16 in offtake pipe 13 serves to control the amount of gas returned through conduit 15. Below tower 6 and space 5 is located a sump 17 which communicates by way of a passage 18 with space 5. A depending baffle 19 divides sump 17 into two chambers 20 and 21 communicating with each other through the open passage way between the bottom of sump 17 and the bottom of baffle 19. A liquid pump 22 is positioned in chamber 21 below the normal liquid level therein and communicates through a pipe 23 with the top of tower 6 and the distributor device 8 therein. Pump 22 is driven by a motor 24 through a drive shaft 25. Chamber 21 also contains a second pump 26 driven by a motor 27 through a drive shaft 28 which serves to deliver liquid from chamber 21 through a pipe 29 as may be desired. Rotary kiln 10 is inclined so that solid material fed into the kiln through a charging funnel 30 will pass through the kiln to the lower end 31 and thence will drop into chamber 21 of sump 17. Means not shown in the drawings are provided for rotating kiln 10.

In carrying out the process of this invention employing the apparatus shown in Fig. 1 for fusing solid sodium nitrate, for example, a combustible material such as fuel oil, is burned with an excess of air in burner 1 and furnace 4 and mixes in chamber 5 with the gases returned through conduit 15. The proportion of oil and air passed through burner 1 and of the gas returned through pipe 15 are regulated so that the temperature of the products of combustion in chamber 5 is maintained below about 750° C. A temperature of about 600° C. for the combustion gases in chamber 5 has been found particularly suitable. Fan 12 draws the hot gaseous products of combustion from chamber 5 through foraminous plate 7 and through the packing in tower 6. A melt of sodium nitrate in sump 17 is circulated by means of pump 22 through pipe 23 into the top of tower 6, whence it flows downwardly through the tower and over the packing material contained therein. The melt passes through foraminous plate 7 and drops to the bottom of chamber 5 and thence returns to sump 17 by way of passage 18. Depending baffle 19 has its lower portion below the surface of the melt in sump 17 and hence forms a seal against the passage of gas from chamber 5 through the sump. In first putting the apparatus into operation, the melt of sodium nitrate in sump 17 may be prepared by introducing sodium nitrate thereinto and fusing it by means of an electrical resistance provided in the sump, which is not shown in the drawings. During operation, the heat absorbed by the recirculating melt in tower 6 maintains the fluid nitrate in sump 17 in a fused condition, but if desired this heating may be supplemented by maintaining the electrical heater in the sump in operation.

The rate of circulation of the melt through tower 6 should be well above that required to thoroughly wet the packing in the tower in order to avoid relatively stagnant liquor layers. The rate of flow of liquor and gas through the tower should be so correlated with the temperature of the gas and liquid entering the tower that the molten nitrate leaving tower 6 is at a temperature below about 400° C. It has been found that the process of this invention may be satisfactorily employed for the fusion of sodium nitrate with the nitrate entering tower 6 at a temperature of about 330° C. and leaving the tower at a temperature of about 350° C., and with the heating gas entering the tower at about 600° C. and leaving tower 6 at a temperature of about 350° C. The velocity of the gas passing through the tower may be varied from but slightly above zero velocity up to the critical gas velocity, which is that velocity above which the gas will prevent the desired flow of liquor from passing down through the packing in the tower. It is apparent, of course, that the critical gas velocity is related to the rate of flow of the liquor in that the higher the liquor velocity the lower is the critical gas velocity. It has been found advisable to maintain a rate of circulation of liquor through the tower such that while in contact with the heating gas the molten sodium nitrate is in a condition of continuous mobility and flow to prevent the formation of relatively stagnant liquor layers in the tower. This maintenance of continuous flow of the liquor is particularly of importance when the heating gas in contact with the liquor is at a relatively high temperature. In general, the rate of circulation of the liquor should be not less than 5 gallons per minute per square foot of cross section of the tower and, as noted above, not less than that required to keep the liquor leaving the tower at a temperature below about 400° C.

The gas drawn from the top of tower 6 through conduit 9 is passed through rotary kiln 10 where it is brought into direct contact with solid sodium nitrate passed through the kiln. The gas which leaves tower 6 at a temperature of, for example, about 350° C. may thus serve to preheat the solid sodium nitrate which then drops from the end of the rotary kiln into the bath of molten sodium nitrate maintained in sump 17 where it is fused by means of the heat absorbed in the melt during its passage through tower 6. From kiln 10 the heating gas may be discharged through fan 12 to the atmosphere or if desired a portion of the gas may be recirculated by means of fan 14 back to chamber 5 where it is heated by means of the hot combustion gases from burner 1 and again passes through tower 6 in contact with the recirculated melt of sodium nitrate. Fused sodium nitrate is withdrawn from sump 17 by means of pump 26 and employed as desired. The withdrawal of fused nitrate from the sump is regulated to correspond in amount to the addition of solid sodium nitrate thereto from kiln 10 so that a fusion of the nitrate is maintained in sump 17 and the melt is continuously recirculated through the circulatory system comprising tower 6, chamber 5 and sump 17 for heating the melt in tower 6 and fusing solid sodium nitrate in sump 17 by means of the heat thus absorbed in the recirculated melt.

It is, of course, apparent that numerous modifications may be made in the apparatus of Fig. 1 and in the process as carried out therein. For example, instead of employing a separate pump 26 for withdrawal of fused sodium nitrate from the sump, a part of the melt which is continuously recirculated by pump 22 may be withdrawn from pipe 23. Furthermore, it is not necessary that in carrying out the process of this invention any part of the heating gas leaving kiln 10 be returned to chamber 5. In addition to the agitation of the molten material in sump 21 caused by the circulation of the melt by means of pump 22 and withdrawal of the same by means of pump 26 it may be found desirable under certain conditions to additionally agitate the melt by means of a stirring device.

Fig. 2 shows another form of apparatus suitable for use in carrying out the process of this invention. In that figure the numeral 40 indicates a burner for a combustible oil or gas introduced through burner 40 into a furnace 41. Furnace 41 is provided with an inlet for air 42 and communicates through a pipe 43 with the bottom of a packed tower 44. From the top of tower 44 a pipe 45 leads to a fan 46 which serves to draw air into furnace 41 through inlet 42 and to draw the hot products of combustion of the air and combustible material through tower 44. A liquid outlet 47 in the bottom of tower 44 is positioned for discharging into a trough 48 which leads to a sump 49. Sump 49 contains a liquid pump 50 operated by a motor 51. A pipe 52 leads from pump 50 to a distributing device 53 within the top of tower 44 positioned to discharge liquid over the packing within the tower. A branch pipe 54 controlled by a valve 55 serves for the withdrawal of liquid pumped from sump 49 by means of pump 50. Above trough 48 there is a conveyor 56 positioned to discharge into trough 48.

In carrying out the process of this invention for the melting of sodium nitrate employing the apparatus of Fig. 2, a combustible material such as oil or a combustible gas is burned in furnace 41 by means of excess air. The hot products of combustion containing free oxygen are drawn by fan 46 through pipe 43 and tower 44, passing upwardly through the packing within the tower. A melt of sodium nitrate is continuously recirculated by means of pump 50 from sump 49, through pipe 52 to distributor 53, and thence flows downwardly over the packing in tower 44 to exit 47 and through trough 48 back to sump 49. While passing through tower 44 and in intimate contact therein with the hot gaseous products of combustion from furnace 41, the melt is heated, for example, to a temperature of about 350–360° C. The thus heated melt in passing through trough 48 receives an addition of solid sodium nitrate from conveyor 56. The solid nitrate is fused by means of the heat introduced into the circulated melt in its passage through tower 44, and molten sodium nitrate is withdrawn through pipe 54 in an amount corresponding to the addition in trough 48 of solid sodium nitrate to the recirculating melt.

The apparatus shown in Fig. 3 comprises an inclined rotary shell 60, which is preferably constructed with a preheat section 61 having a relatively small diameter and a fusion section 62 having a larger diameter. Fusion section 62 and, if desired, preheat section 61 may be provided in their interiors with flights, as is well known in the construction of rotary kilns. The discharge end of rotating shell 60 carries a retainer ring 63. A burner 64 and furnace 65 communicate with the discharge end of rotary kiln 60 through a pipe 66. The discharge end of the rotary kiln enters a chamber 67 having an outlet 68 for a liquid material which discharges to a sump 69. A liquid pump 70 operable by means of a motor 71 is provided for the removal of liquid from sump 69 through a pipe 72. A valve 73 in pipe 72 serves to control the flow of liquid through the pipe. The inlet end of rotary shell 60 communicates through a stationary shell 74 and pipe 75 with a fan 76, which serves to draw air into furnace 65 for burning a combustible material introduced to burner 64 and to draw the hot products of combustion through fusion section 62 and preheating section 61 of rotating shell 60 and to discharge the gases from pipe 75 to the atmosphere. A conveyor 77 is positioned to discharge solid material into a feed funnel 78 leading into the inlet end of rotating shell 60.

In employing the apparatus of Fig. 3 for fusing solid sodium nitrate, the nitrate is fed from conveyor 77 through funnel 78 into the preheating section 61 of rotary shell 60. The sodium nitrate passes through the preheating section and is heated by direct contact with the heating gas passing therethrough. In starting operations the heated nitrate passes from section 61 into section 62 where it is fused by the gases introduced from furnace 65. A pool of fused sodium nitrate is maintained in fusion section 62 by means of retainer ring 63, and in the normal operation of the apparatus, this fusion of sodium nitrate is heated by direct contact with the hot gases of combustion from furnace 65. The thus heated pool of molten nitrate continuously receives additions of solid sodium nitrate which has been preheated in section 61. The solid sodium nitrate is fused by means of the heat absorbed in the fusion from the heating gases and a corresponding amount of fused sodium nitrate flows over retaining ring 63 and through outlet 68 to sump 69 whence it is pumped through pipe 72 to the point where it is to be used.

While the specific embodiments of my invention described above have been with particular reference to the fusion of sodium nitrate, it is to be understood that the apparatus and the principal features of the processes carried out therein as described above, are likewise applicable to the fusing of other nitrate and nitrite salts, such as potassium or ammonium nitrate or sodium or potassium nitrite. It may be necessary in particular instances to somewhat modify the exact operating conditions with respect to the temperature of heating of the salt and/or of the temperature of the heating gas contacted therewith, since the melting points of the various salts and the temperatures at which they are decomposed vary with the different salts. Such adjustments in the operation of the processes described to adapt them to a particular salt, are within the skill of a trained worker in the field to which this invention relates.

Furthermore, while I have particularly described processes in which a fuel oil is burned with an excess of air to produce the heating gas used for the melting of the nitrate, other combustible materials may be employed in place of the oil. It is apparent that the heating gas should be substantially chemically inert with respect to the nitrate. In general, therefore, the gas should be non-reducing and preferably is an oxidizing gas, such as one containing free oxygen. Accordingly, in the particular examples given above, the fuel oil is burned with an excess of air to insure against the presence in the heating gas of excessive amounts of free carbon or reducing gases such as carbon monoxide which may react with the nitrate.

Since certain changes may be made in carrying out the above process without departing from the scope of the invention, it is intended that all matter contained in the above description shall be interpreted as illustrative and not in a limiting sense.

I claim:

1. The process of fusing a solid material which comprises continuously recirculating a melt of said material in a circulatory system, and in said system passing the melt in one stage in direct contact with a heating gas and in a subsequent stage introducing said solid material into the thus heated melt, and continuously withdrawing from the aforesaid system said material in a molten condition.

2. The process of fusing a solid inorganic salt which comprises continuously recirculating a melt of said salt in a circulatory system and in said system passing the melt in one stage in direct contact with a heating gas and in a subsequent stage introducing said solid salt into the thus heated melt, and continuously withdrawing from the aforesaid system said salt in a molten condition.

3. The process of fusing a solid fusible salt of an alkali metal and an oxy-acid of nitrogen which comprises directly contacting a melt of said salt with a heating gas and introducing into the thus heated melt said solid salt.

4. The process of fusing a solid fusible salt of an alkali metal and an oxy-acid of nitrogen which comprises directly contacting a melt of said salt with a substantially non-reducing heating gas and introducing into the thus heated melt said solid salt.

5. The process of fusing a solid fusible salt of an alkali metal and an oxy-acid of nitrogen which comprises passing hot products of combustion containing free oxygen in contact with a melt of said salt and introducing into the thus heated melt said solid salt.

6. The process of fusing a solid fusible salt of an alkali metal and an oxy-acid of nitrogen which comprises directly contacting a melt of said salt with a heating gas, withdrawing the thus heated melt from contact with the heating gas, and introducing said solid salt into the heated melt.

7. The process of fusing a solid fusible salt of an alkali metal and an oxy-acid of nitrogen which comprises continuously recirculating a melt of said salt in a circulatory system, and in said system passing the melt in one stage in direct contact with a heating gas and in a subsequent stage introducing said solid salt into the thus heated melt, and continuously withdrawing from the aforesaid system said salt in a molten condition.

8. The process of fusing a solid fusible salt of an alkali metal and an oxy-acid of nitrogen which comprises passing a melt of said salt in countercurrent flow and in direct contact with a heating gas, and introducing into the thus heated melt said solid salt.

9. The process of fusing solid sodium nitrate which comprises directly contacting a melt of sodium nitrate with a heating gas and introducing into the thus heated melt solid sodium nitrate.

10. The process of fusing solid sodium nitrate which comprises directly contacting a melt of sodium nitrate with a substantially non-reducing heating gas and introducing into the thus heated melt solid sodium nitrate.

11. The process of fusing solid sodium nitrate which comprises directly contacting a melt of sodium nitrate with a heating gas, passing the gases from said contact with the melt in contact with solid sodium nitrate to preheat the same, and introducing the thus preheated solid sodium nitrate into said melt.

12. The process of fusing solid sodium nitrate which comprises directly contacting a melt of sodium nitrate with a substantially non-reducing heating gas, withdrawing the thus heated melt from contact with the heating gas, and introducing solid sodium nitrate into the heated melt.

13. The process of fusing solid sodium nitrate which comprises passing hot products of combustion containing free oxygen in contact with a melt of said nitrate and introducing into the thus heated melt solid sodium nitrate.

14. The process of fusing solid sodium nitrate which comprises continuously recirculating a melt of sodium nitrate in a circulatory system and in said system passing an oxidizing heating gas in direct contact with said melt and introducing into the thus heated melt solid sodium nitrate.

15. In a process for fusing solid sodium nitrate, that improvement which comprises heating a melt of said nitrate by introducing a non-reducing heating gas into direct contact therewith and maintaining the melted nitrate at a temperature below about 400° C. while in contact with said heating gas.

16. The process of fusing solid sodium nitrate which comprises contacting a melt of sodium nitrate with a heating gas, maintaining said melt while in contact with the heating gas in a condition of continuous mobility, and introducing into the thus heated melt solid sodium nitrate.

17. The process of fusing solid sodium nitrate which comprises passing hot products of combustion containing free oxygen in direct contact with a melt of said nitrate, maintaining the melted nitrate at a temperature below about 400° C. and introducing solid sodium nitrate into the heated melt.

18. The process of fusing solid sodium nitrate which comprises passing hot products of combustion containing free oxygen in direct contact and in countercurrent flow with a melt of sodium nitrate and during said direct contact of the heating gases and the melt maintaining said melt in a condition of continuous mobility and at a temperature below about 400° C., and introducing into the thus heated melt solid sodium nitrate.

19. The process of fusing solid sodium nitrate which comprises continuously recirculating a melt of sodium nitrate into direct contact with a heating gas, introducing solid sodium nitrate into the thus heated melt, and withdrawing therefrom a corresponding amount of fused sodium nitrate.

20. The process of fusing solid sodium nitrate which comprises burning a combustible material with excess air to produce hot products of combustion containing free oxygen, continuously recirculating a melt of sodium nitrate in a circulatory system including a packed tower, passing said products of combustion through said tower in direct contact with and in counter current flow with the melt of sodium nitrate passing therethrough, maintaining a flow of said melt through said tower of not less than about 5 gallons per minute per square foot of cross section of the tower and not less than that required to maintain the melt in contact with the hot products of combustion below about 400° C., introducing solid sodium nitrate into the thus heated melt and withdrawing therefrom a corresponding amount of fused sodium nitrate.

21. The process of fusing solid sodium nitrate which comprises continuously recirculating a melt of sodium nitrate into direct contact with a heating gas, maintaining said melt at a temperature below about 400° C., introducing into the thus heated melt solid sodium nitrate and withdrawing therefrom a corresponding amount of fused sodium nitrate.

22. The process of fusing solid sodium nitrate which comprises burning a combustible material with excess air to produce hot gaseous products of combustion containing free oxygen, maintaining the temperature of said products of combustion below about 750° C., continuously recirculating a melt of sodium nitrate into direct contact with and in countercurrent flow with said products of combustion, maintaining said melt while in contact with the gaseous products of combustion in a condition of continuous mobility and at a temperature below about 400° C., introducing into the thus heated melt solid sodium nitrate and withdrawing therefrom a corresponding amount of fused sodium nitrate.

23. The process of fusing a salt of an alkali metal and an oxy-acid of nitrogen which comprises contacting a melt of said salt with a heating gas having a temperature materially higher than the decomposition temperature of said salt while maintaining the temperature of said melt while in contact with said heating gas at a temperature not materially above the decomposition temperature of said salt.

24. The process of fusing a salt of an alkali metal and an oxy-acid of nitrogen which comprises contacting a melt of said salt in countercurrent flow with a heating gas having a temperature materially higher than the decomposition temperature of said salt, and maintaining the temperature of said melt at its last point of contact with the heating gas not materially above the decomposition temperature of said salt.

25. The process of fusing a solid fusible salt of an alkali metal and an oxy-acid of nitrogen which comprises recirculating a gas in a cyclic system, burning a combustible material and mixing the resulting hot gaseous products of combustion with the gas circulating in said system, passing the mixed gases in direct contact with a melt of the aforesaid salt, introducing into the thus heated melt said solid salt, and withdrawing from the cyclic system a portion of the gases recirculating therein.

26. The process of fusing a solid fusible salt of an alkali metal and an oxy-acid of nitrogen which comprises continuously recirculating a melt of said salt in a cyclic system, continuously recirculating a gas in a second cyclic system, said systems communicating with each other in a stage common to both systems wherein the recirculating gas and liquid are passed in direct contact and countercurrent flow with each other, burning a combustible material and mixing the resulting hot gaseous products of combustion with the gas recirculating in said second system, passing the mixed gas in contact with the melt recirculating in the first mentioned system in the stage common to both systems, introducing said solid salt into the thus heated melt, withdrawing therefrom a corresponding amount of fused salt, and withdrawing from the second cyclic system a portion of the gases recirculating therein.

27. The process of fusing a solid fusible salt of an alkali metal and an oxy-acid of nitrogen which comprises recirculating a gas in a cyclic system, burning a combustible material with excess air to produce hot gaseous products of combustion containing free oxygen, mixing said hot gaseous products with the gas circulating in said system, passing the mixed gases in direct contact and in countercurrent flow with a melt of the aforesaid salt to absorb heat from the gases and maintain a relatively large temperature differential between the point of first contact of said gases and melt and the point of last contact therebetween, introducing into the thus heated melt said solid salt and withdrawing from the cyclic system a portion of the gases recirculating therein.

HERMAN ALBERT BEEKHUIS.